United States Patent

Reisch

[15] 3,697,672

[45] Oct. 10, 1972

[54] METHOD FOR THE ESTABLISHMENT OF CONFERENCE TELEGRAPHY CONNECTIONS IN CENTRALLY CONTROLLED TELEGRAPHY DIAL EXCHANGE INSTALLATIONS

[72] Inventor: Hans Reisch, Munich, Germany

[73] Assignee: Siemens Aktiengesellschaft, Berlin and Munich, Germany

[22] Filed: Aug. 18, 1969

[21] Appl. No.: 850,979

[30] Foreign Application Priority Data

Aug. 21, 1968 Germany..........P 17 62 761.1

[52] U.S. Cl.......................................................178/3

[51] Int. Cl.............................................H04l 11/00

[58] Field of Search.........178/3, 2; 179/18 BC, 18 D, 179/18 ES

[56] References Cited

UNITED STATES PATENTS

| | | | |
|---|---|---|---|
| 3,510,594 | 5/1970 | Oden | 179/18 BC |
| 3,445,602 | 5/1969 | Gitten et al. | 179/18 D |
| 3,441,678 | 4/1969 | Budlong et al. | 179/18 BC |
| 3,377,433 | 4/1968 | Whitney | 179/18 BC |
| 3,210,476 | 10/1965 | Shaer | 179/18 BC |
| 3,133,157 | 5/1964 | Platt et al. | 179/18 D |

*Primary Examiner*—Kathleen H. Claffy
*Assistant Examiner*—Thomas W. Brown
*Attorney*—Birch, Swindler, McKie & Beckett

[57] ABSTRACT

In centrally controlled telegraphy dial exchange installations provided with a facility for making conference connections, the conference telegraphy system is connected to the trunk seized by the calling subscriber over an outgoing trunk, whereupon information necessary to establish the conference connection is registered. Then the conference telegraphy system seizes a number of incoming trunks corresponding to the number of subscribers to take part in the conference call, and the establishment of and accounting for the conference call proceed over the central control means of the exchange, in the manner of individual connections.

4 Claims, 1 Drawing Figure

PATENTED OCT 10 1972 3,697,672
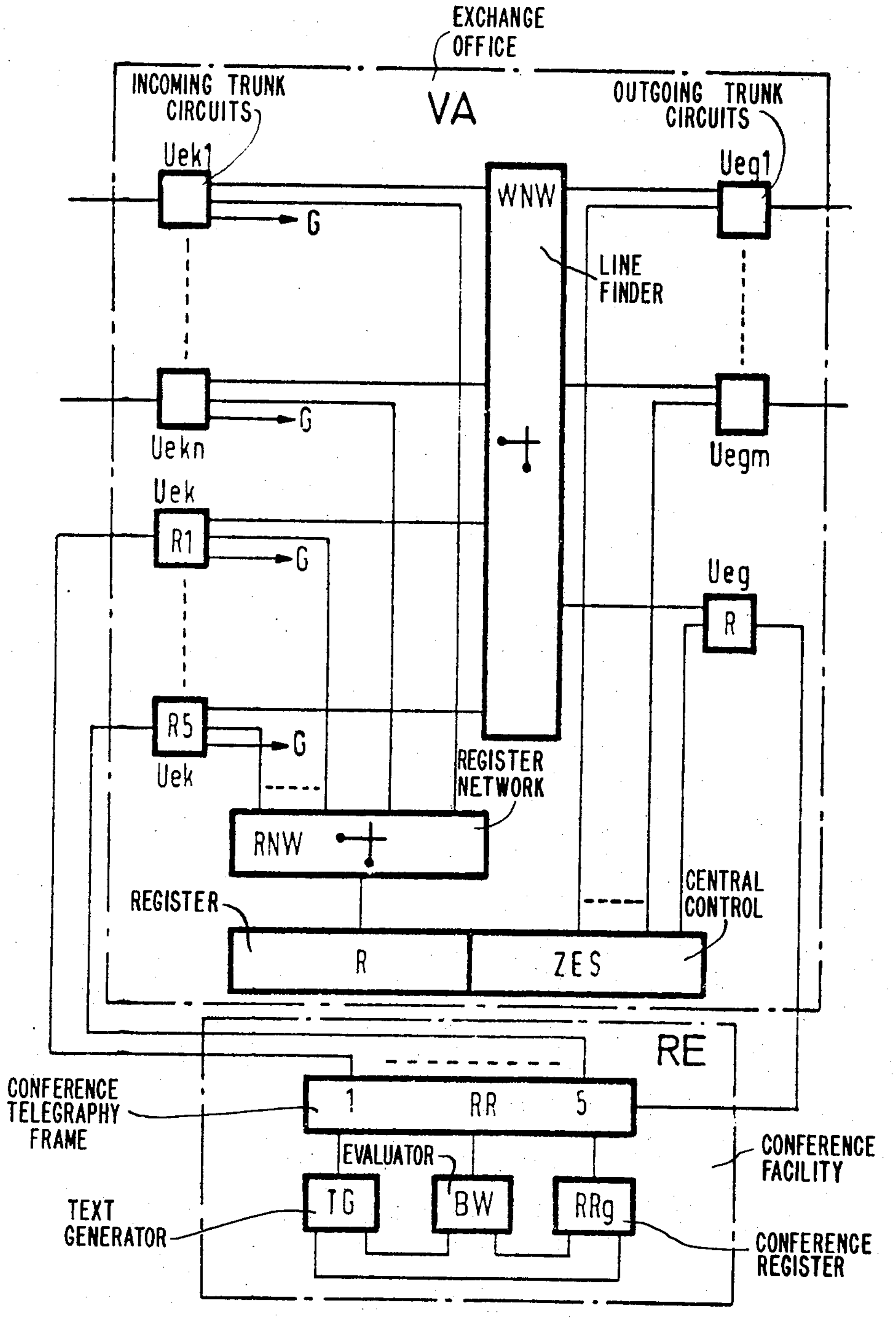

METHOD FOR THE ESTABLISHMENT OF CONFERENCE TELEGRAPHY CONNECTIONS IN CENTRALLY CONTROLLED TELEGRAPHY DIAL EXCHANGE INSTALLATIONS

GENERAL DESCRIPTION

The invention concerns a method to establish conference telegraphy connections in centrally controlled telegraph dial exchange installations.

The establishment of conference telegraphy connections according to the state of the art requires that in the exchange office a conference telegraphy frame which can be dialed by a subscriber authorized to participate in conference telegraphy, exists, under the control whereof the establishment of conference telegraphy connections is carried out over special dialing systems. A special problem in this connection is posed by the charge determination in a conference telegraphy connection which can only be solved through special requirements, for example through the employment of special pre-selector (dialing) bus bars.

Recently, centrally controlled telegraphy exchange systems (teleprinter systems) have become known. An example of such a system is the model TWKD described in the *Siemens-Zeitschrift*, Vol. 42 (1968, issue 6, pages 443 and the following). In a system of the named type all exchange operations are centrally controlled. Every demand which reaches the exchange and leads, as is known, to the occupation of an incoming line at the input of the exchange, causes the switching on of a free register over a register network, for example, a switching matrix. Over the path switches through between an occupied line and a register of the exchange, the dialing information passes to the register and is there available to a central control. The central control is in a position to evaluate this information, and, dependent on the evaluation to occupy an outgoing line. The central control switches through a path leading over the exchange path network, which, for example, is also a multiple stage switching matrix. Therewith a certain incoming occupied line is then connected over the path network with a certain outgoing trunk line.

In such a system, it is desirable to offer the subscribers the possibility of forming conference telegraphy connections. The previously known processes and arrangements for the formation of conference telegraphy connections are, however, not suited for inclusion in a centrally controlled exchange system of this type. Therefore, the invention is based on the problem of making it possible for the subscribers connected to a centrally controlled exchange system to form conference telegraphy connections and to retain thereby all the advantages of a centrally controlled exchange system. The invention also seeks to provide the possibility of modifying previously existing centrally controlled exchange installations which are not adapted for the formation of conference telegraphy connections without large changes in the system, and it seeks to make this possible in such a way that the formation of conference telegraphy connections is readily possible.

In accord with the invention, this will be solved in that the central conference telegraphy facility contains its own register adapted to receive all information necessary for the formation of conference telegraphy connections. This information is sent by the subscriber in a continuous series. The conference telegraphy facility is connectable on its input side over an outgoing trunk line of the exchange. The latter trunk line is seized through evaluation in the central control of the exchange of a special service number dialed by the subscriber and communicated to the register of the central control as well as to the path network. The conference device is connectable on its output side to the central control over a number of incoming trunk lines corresponding to the number of conference telegraphy participants. For the formation of a conference telegraphy connection, the information contained in the register of the conference telegraphy facility reaches the central control in the exchange.

Thereby ordinary trunks of the exchange office are employed for the outgoing trunk, over which the central conference telegraphy system is reached, as well as for the incoming trunks over which the central control of the exchange office is reached from the central conference telegraphy system. As the central systems of the exchange office, as for example registers, path network, dial evaluator, charge determination system, classification comparators, etc. are commonly employed, no interference with the exchange office is necessary in order to afford to each subscriber the possibility to establish conference telegraphy connections.

Over the trunks which can be reached from the conference telegraphy system, a charge determination is also possible over the charge determination system already existing in the exchange office without interference and additional costs.

DETAILED DESCRIPTION

Details of the invention are explained in the following with the aid of a circuit diagram shown in the drawing.

The exchange office designated by VA in the drawing contains the incoming seizable trunk repeaters Uekl to Uekn and the outgoing freely dialable trunk repeaters Uegl to Uegm. An incoming seized trunk is connectible over a register network RN W to a register R, which is part of central control ZES of the type described hereinabove. From the classification and dial-information reaching register R the path network or repeater matrix WNW is optimally through-connected in the known manner, over central control ZES, under consideration of the existing traffic conditions, so that then a connection exists between a seized incoming trunk and a dialed outgoing trunk. After the through-connection, register R is then available for further through-connection operations.

The conference facility RE is connected to the exchange VA over one outgoing trunk line UegR and over a series of incoming trunk lines UekR1 through UekR5. These lines are connected with the facilities of the exchange VA in the same manner as the lines which are provided for the formation of normal connections between two subscribers. Accordingly, the incoming trunk lines UekR1 through UekR5 can be connected over the register network RNW to a register R, and the outgoing line UegR can be controlled by the central control ZES. Each of the cited lines also has access to path network or repeater matrix WNW, over which a connection is put through in the known manner by the marking of the inputs and outputs of the switches of the path network from the central control ZES. As is explained in detail in the following, a conference telegraphy facility connected to the exchange VA in accord with the invention permits the formation of conference telegraphy connections corresponding to the formation of individual connections.

The conference telegraphy facility RE contains the conference telegraphy frame RR, the text generator TG, the evaluator BW and the register RRg. The circuitry constituting each of these elements is known and will not be further described herein.

The formation of a conference telegraphy connection will now be described. When a subscriber connected to the exchange VA wants to form a conference telegraphy connection, for example to five other subscribers, then he sends out in a known manner a call signal which leads to the seizing of an incoming trunk line, for example, the transmission Uek1. As described, this transmission will be connected over the switching matrix RNW to a free register R. The subscriber thereupon receives a request to begin dialing. In order to identify his demand for a connection as a demand for conference telegraphy, he sends out in the known manner a special service number which reaches the register R over the already existing path and which is recognized and evaluated by the central control ZES. Based on this evaluation, the outgoing trunk line UegR is seized by the central control, and over this line the conference telegraphy facility RE is then reached like a normal called subscriber. The conference telegraphy facility thereon sends a notification signal back to the central control ZES, and it is given the classification of the calling subscriber stored in the register R. The classification information will then be stored in the register RR*g* of the conference telegraphy facility RE. At the same time, the connection between the incoming and the outgoing trunk lines Uek1 and UegR have been put through over the switching matrix WNW in a known manner, so that the conference telegraphy facility is connected to the calling subscriber.

At this point, the known steps in the operation of a conference telegraph facility will be started. First, the assigned text generator TG is switched on, and it sends, in the known manner, the calling subscriber a request over the existing connection which request causes the calling subscriber to send out his own call number, an order signal and the numbers of all subscribers who are to take part in the conference telegraphy in a continuous series. He then sends a dialing-in signal. All of the information which reaches the conference telegraphy facility in this manner, over the previously described connection, is received in the register RR*g* of the conference telegraphy facility RE. This receipt of information in the register RRg always takes place, in the known manner, with the cooperation of the evaluator BW. Evaluator BW is developed in such a way that it recognizes errors in the execution of a dialing process, if, for example, letters or other characters are received in place of the numerals 1 through 0. In such a case, the connection will be immediately extinguished. Of course, it is also possible to evaluate the previously mentioned classification characterizing signal in order to check in this manner the entitlement of a calling subscriber to conference telegraphy and to thereby make sure that, for example, only domestic subscribers are connected to the conference telegraphy connection.

Under the assumption that, for example, five subscribers are to be connected to the conference telegraphy connection which is to be formed, after the completed dialing, there are in the register RRg a classification characterizing signal, an order signal, five call numbers and a dialing end signal. After the receipt of the dialing end signal, the incoming trunk lines UekR1 through UekR5 are successively seized under the control of the conference telegraphy frame RR. Viewed from the exchange, this seizure is in no way different from the seizure caused by a normal call request. That means that each of the named transmissions UekR5 is connected over the switching matrix RNW with a register R, which then is given the classification, the number of the calling subscriber and the number of the called subscriber. Thus, all of the numbers of the subscribers taking part in the conference telegraphy connection are available to the central control ZES. Viewed from the exchange standpoint, the formation of the conference telegraphy connection then proceeds in the same manner as the formation of individual connections. That is, a trunk line Ueg 1 through Ueg *m*, which goes in the desired direction, is occupied over the central control ZES and connected over the switching matrix WNW under consideration of existing traffic conditions with the seized lines UekR1 through UekR5. After one of the conference telegraphy participants is reached, by switching on the text generator TG, he is sent, in the known manner, a request to send his name-giving text and an information about participation in a conference. This procedure is repeated in any case after a subscriber is reached.

After all of the conference telegraphy participants are connected, the conference telegraphy frame RR connects the text generator TG once again, to the connection, and the text generators then sends, in the known manner, a conference telegraphy start signal to the calling subscriber. The individual trunk lines UekR1 through UekR5 receive a connection completion signal over conference telegraphy frame RR. The latter signal causes the connection of these lines to a charge computing facility G.

The end of the conference telegraphy connection is recognized by the evaluator BW by reason of an end signal transmitted by the calling subscriber. After the recording of the identification of the connected conference telegraphy subscribers the circuit of the conference telegraphy connections is opened over conference telegraphy frame RR, and after acknowledgement to the calling subscriber the connection to it is also released. Simultaneously with the opening of the conference telegraphy connection the charge determination system is caused, by a signal to trunks UekR1 to UekR5, to terminate the counting of time. As the trunks are also connected during a conference telegraphy connection, the marking of time is also stopped in the case a conference telegraphy subscriber prematurely releases the conference telegraphy connection. In this manner there results an individual charge determination, the result whereof is either kept in the exchange office and/or ascribed to the calling subscriber at the end of the connection.

It will be understood that many changes can be made in the embodiment of the invention described above without departure from the scope of the invention. Accordingly, the invention is not to be considered limited to the described embodiment, but rather only by the scope of the appended claims.

I claim:

1. A method for establishing conference telegraphy connections in a centrally controlled dial exchange installation, comprising the steps of:

connecting a conference telegraphy frame over an outgoing trunk line of said exchange, through the central control, to an incoming trunk line of said exchange previously seized by a calling subscriber and to a register in said exchange, causing the request, evaluation and storage of information necessary to the completion of a conference connection, seizing, using the conference telegraphy frame, a number of incoming trunk lines corresponding to the number of subscribers to be called into the conference, communicating said information to the central control and establishing the conference telegraphy connections over the central control in the same manner according to which individual connections would be completed.

2. The method according to claim 1, including the step of connecting the incoming trunks (VekR1 to UekR5) seized by the conference telegraphy frame (RE) to a charge determination system (over G) of the exchange office (VA) in the same manner as an ordinary incoming trunk, determining the charge for each conference telegraphy connection according to the principle of charge determination of an individual connection.

3. The method according to claim 1, including the step of determining the allowability of a desired conference telegraphy connection (in evaluator BW) before a connection is fully established and in case of a negative finding, releasing the partially established connection.

4. Apparatus for the formation of conference telegraphy connections in centrally controlled dial exchange installations having a conference telegraphy frame constituted by a text generator, an evaluator and a conference register adapted to receive in continuous series all information sent by the calling subscriber for completing a conference connection, comprising:

means for connecting the input of said conference frame to an outgoing trunk line of said exchange responsive to evaluation of a special signal dialled by the calling subscriber, by said central control, means for connecting the outputs of said conference frame to a number of incoming trunk lines corresponding to the number of called subscribers to be connected into the conference and, means for communicating the information contained in said conference register to said central control for completing the conference connection to said called subscribers in the same manner as individual connections would be completed.

* * * * *